United States Patent [19]
Preisig

[11] 3,811,549
[45] May 21, 1974

[54] APPARATUS FOR HANDLING A FLOW OF BOXES

[75] Inventor: Roland Preisig, Yens, Switzerland

[73] Assignee: J. Bobst & Fils SA

[22] Filed: May 10, 1973

[21] Appl. No.: 358,959

[52] U.S. Cl................. 198/21, 198/20, 198/34, 198/106, 214/8.5 SS, 271/213, 271/214, 53/159
[51] Int. Cl............................................. B65g 47/00
[58] Field of Search.......... 198/20, 24, 21, 34, 221, 198/106; 214/7, 8.5 SS; 53/61, 159; 271/213, 214

[56] References Cited
UNITED STATES PATENTS

| | | | |
|---|---|---|---|
| 3,729,084 | 4/1973 | Stuart et al. | 198/21 |
| 3,127,029 | 3/1964 | Luginbuhl | 214/7 |
| 3,562,775 | 2/1971 | Mullins | 53/159 |

Primary Examiner—Evon C. Blunk
Assistant Examiner—Joseph E. Valenza
Attorney, Agent, or Firm—Hill, Gross, Simpson, Van Santen, Chiara & Simpson

[57] ABSTRACT

An apparatus for handling a plurality of articles, such as folded or collapsed boxes, which are received as a flow of articles moving in one direction from a conveyor device, characterized by a table arranged to receive the articles from an end of the conveyor device and having a pair of slots in a surface thereof, a pair of skates or skids received in the parallel slots and displaceable therealong for receiving the articles as they are deposited onto the table to transport the article across the table out of contact with the surface of the table. The device further includes a moveable stop which engages the skate combination and urges them in a direction toward the conveyor device and a brake device acting on the moveable stop to control the movement of the skate and flow of boxes across the table.

7 Claims, 2 Drawing Figures

APPARATUS FOR HANDLING A FLOW OF BOXES

BACKGROUND OF THE INVENTION

1. Field of the Invention

The present invention is directed to a conveying or handling apparatus for a flow of articles, such as collapsed or folded boxes, that are placed on their edge by the manufacturing machine.

2. Prior Art

Known devices for manufacturing folded boxes delivers the boxes to a known device which raises the folded boxes onto one edge for forming a bed of upright boxes moving in a flow. This flow of boxes or articles is then separated successively into packets of a predetermined number which packets are then introduced into containers for shipping.

The known handling devices for separating the flow of articles, such as folded boxes, into separate packets comprise a table having a moveable stop traveling thereon and provided with a separator which is moved into the flow of articles to divide it into the individual packets. In operation, the flow of boxes acts against the moveable stop and forces it across the surface of the table until the desired number of boxes is received at which time the separator is actuated to separate the packet from the main flow. To obtain the desired packing factor for boxes in the packet, the brake means or device acts on the moveable stop to insure the proper pressure being applied to the boxes being separated. In the presently known devices, the flow of articles, such as folded boxes, are carried to the vicinity of the separator by one or more belts disposed therebeneath. At the point of the separator, the edges of the folded boxes are deposited on the table while the first box engages the moveable stop. Thus, movement of the flow along the top of the table creates frictional forces between the boxes and table top which forces oppose the movement and influence the control of the braking device. As a result of these frictional forces, it is difficult to obtain the desired packing factor of the individual articles being subdivided into the packets.

SUMMARY OF THE INVENTION

The present invention is directed to a device or apparatus for handling a flow of articles, such as folded boxes, without the influence of a frictional force between the table of the apparatus and the article being present. To accomplish this, the apparatus has a table whose upper surface is below the surface of the conveyor belts delivering the flow of articles and which table has at least one displaceable plate which receives the boxes being deposited from the conveyor device and which plate moves with the flow across the table. Brake means are provided for opposing the advance of the flow which brake means can be adjusted to obtain the desired packing factor between the article. Preferably, the moving plate comprises a pair of skates or skids which are received in parallel extending grooves and are interconnected by a connecting means which cooperates with a moveable stop which is connected to the brake means and is provided with bearing means to urge the stop and the skids toward the conveyor device. Preferably, the connecting means comprises an angle iron which will engage a fixed stop mounted on the table to limit displacement of the interconnected skids from the end of the conveyor device.

DESCRIPTION OF THE PREFERRED EMBODIMENTS

Figure 1:
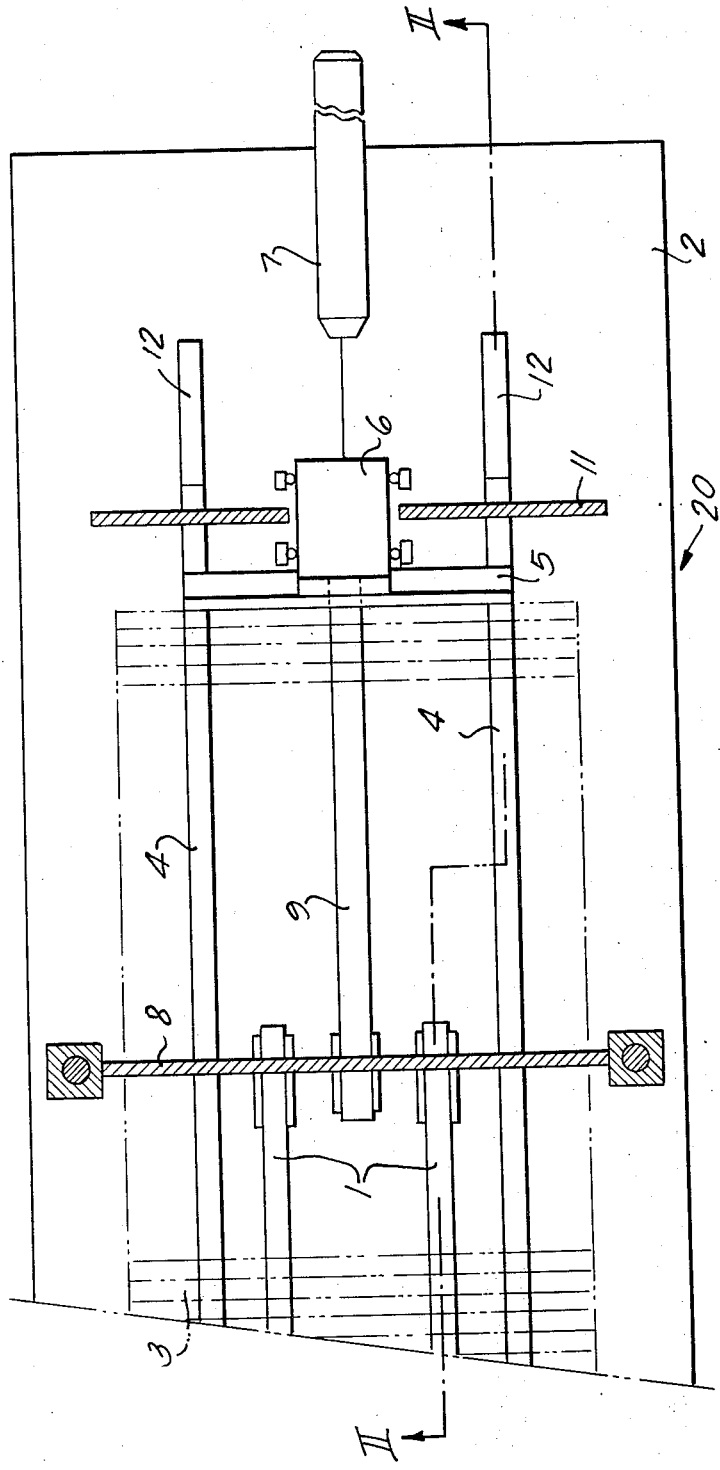
FIG. 1 is a plan view of the handling apparatus of the present invention.
Figure 2:
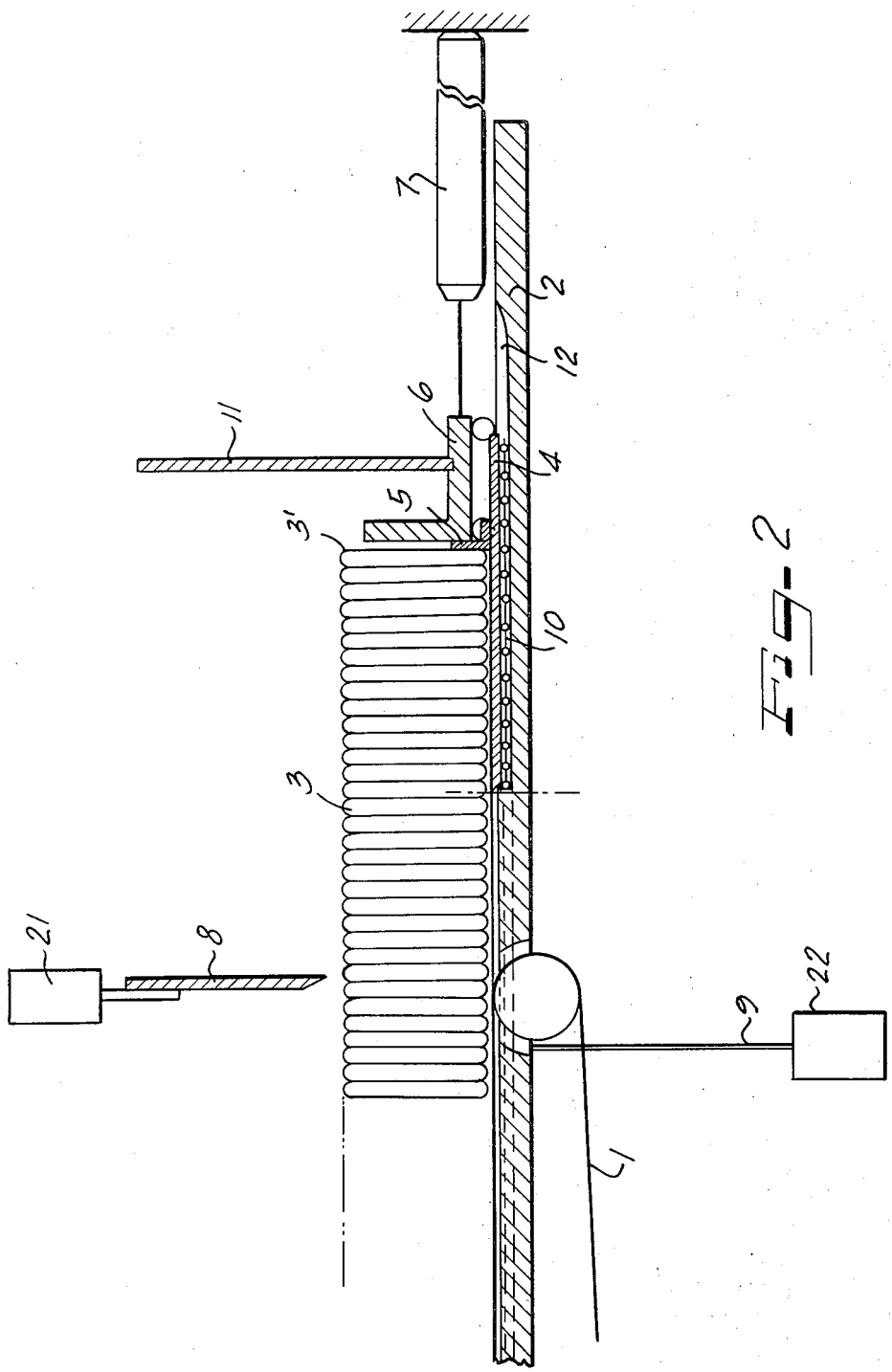
FIG. 2 is a cross-sectional view with portions in elevation taken along a line II—II of FIG. 1.

The principles of the present invention are particularly useful in a handling device or apparatus generally indicated at 20, for receiving a flow of individual articles 3, such as folded boxes, from a pair of conveyor belts 1 of a conveyor device. The device 20 comprises a table 2 having an upper surface which is beneath the upper surface of the belts 1 on which the articles 3 are carried and the upper surface of the table 2 has a pair of parallel recesses or grooves 12 which extend parallel to the direction of the flow of the articles 3. Disposed in each of the grooves 12 is a plate such as a skid or skate 4 and the skates are interconnected by connecting means, such as a connecting piece 5 which is illustrated as being an angle iron. As illustrated, the upper surface of the skids 4 forming the plate is above the upper surface of the table 2 but beneath the upper surface of the belts 1 so that the flow of articles 3 are deposited from the belt 1 onto the skids or skates 4 without touching the upper surface of the table 2.

A moveable stop 6, which, as illustrated, is disposed on rollers, engages the angle iron 5 and is connected to means 7 which apply a braking force to resist advancement of the stop 6 along with the skates or skids 4 as they are forced away from the ends of the conveyor belts 1 by the flow of articles 3. Preferably, a rigid or fixed stop 11 is disposed on the table 2 and is provided with an opening to allow passage of the moveable stop 6 while engaging the angle iron 5 to prevent further movement passed a given point on the table 2 of the interconnected skates 4 away from the conveyor belts 1.

Adjacent the ends of the conveyor belts 1, a separator 8 is provided. The separator 8 can be a plate mounted for reciprocation along a plane extending perpendicular to the upper surface of the table 2 at the termination of the conveyor belts 1 of the conveying device. To reciprocate the plate 8 between a withdrawn position (as illustrated) and the blocking position, a ram, such as 21, is provided.

The moveable stop 6 is attached to means biasing the stop 6 and the skids 4 toward the end of the conveyor belts 1. As illustrated, this means comprises a belt 9 connected to the moveable stop 6 and provided with a counter weight 22.

To reduce the friction of the skates 4 during displacement in the grooves 12, each of the skates is mounted on a rollway consisting of a plate 10 provided with a plurality of needle bearings.

The device operates in the following manner. At the beginning of a cycle, the separator 8 has been reciprocated down into the path of the flow of articles 3 and the moveable stop 6 is biased against the separator due to the counter weight 22 acting on the belt 9. Due to the engagement of the stop 6 with the angle iron 5, the two skids or skates 4 have been displaced towards the conveyor belt 1 until either the angle iron 5 engages the separator 8 or the moveable stop 6 has engaged the separator 8. The conveyor belts 1 are urging the flow of articles 3 against the separator which is preventing further movement of the articles onto the table 2.

When the separator is withdrawn from the path of the articles 3, the lead article 3' engages the angle iron 5 and the vertical extension of the moveable stop 6. Due to the force applied by the conveyor belts 1, the flow of articles 3 will push the angle iron 5 and the moveable stop 6 away from the end of the conveyor belts 1. As the articles 3 leave the conveyor belts 1, they are deposited on the upper surfaces of the skids or skates 4 which support them above the upper surface of the table 2. Thus, the flow of the boxes 3 passing under the separator 8 will not be affected by a frictional engagement of the boxes or articles 3 on the table surface 2. The force delivered to the flow by the conveyor belts 1 is resisted by the brake means 7 which ensures a desired packing of the articles 3 being delivered to the apparatus 20. The flow will continue to move across the table 2 until the fixed stop 11 prevents further movement due to engagement with the angle iron 5. As illustrated, the moveable stop will pass through the spacing between the two portions forming the fixed stop 11 and can be utilized to trip an appropriate circuit for actuating the ram 21 to reciprocate or move the separator 8 down to divide the articles disposed between the fixed stop 11 and separator 8 from the remaining portion of the flow of articles remaining on the belts 1.

With the separator now cycled to the down position, the articles 3 disposed between the fixed stop 11 and the separator 8 forms a packet which can be subsequently shifted from the table 2 by an appropriate ram (not illustrated) for insertion into containers. With removal of the packet of articles 3 which was formed between the separator 8 and the fixed stops 11, the biasing means such as the counter weight 22 urged the moveable stop 6 against the connecting piece 5 to shift the skates and the moveable stop back to the initial starting position with relationship to the separator 8 to repeat the cycle.

Although various minor modifications might be suggested by those versed in the art, it should be understood that I wish to employ within the scope of the patent granted hereon, all such modifications as reasonably and properly come within the scope of my contribution to the art.

I claim:

1. An apparatus for handling a plurality of articles received as a flow of articles moving in one direction from a conveyor device having a surface for transporting the articles, said apparatus comprising a table with an upper surface disposed beneath the surface of the conveyor device and being arranged to receive the flow of articles from the end of the device, an elongated recess in said upper surface of the table extending parallel to said one direction, a plate mounted in said elongated recess for displacement therealong, said plate having an upper surface disposed at a level between the upper surface of the table and the surface of the conveyor device, said plate having means forming a stop for engaging the leading article of the flow of articles, means biasing the plate towards said conveyor device, and means applying a braking force to oppose movement of the plate in the opposite direction along said recess so that a force applied to the flow of articles by the conveyor device moves the articles onto the plate and displaces the plate away from the device and the force is free from resistance due to friction of the articles on the table surface.

2. An apparatus according to claim 1, wherein the plate is mounted on a rollway having needle bearings disposed in said recess.

3. An apparatus according to claim 1, wherein the stop means is a separate element engaging a portion of the plate for moving the plate toward the conveyor device, said separate element of the stop means being linked to the brake means and to the means for biasing the plate toward the conveyor device.

4. An apparatus according to claim 1, wherein said recess is an elongated slot and said plate is an elongated skate disposed in said slot, and which includes a second elongated slot parallel to the first mentioned slot, a second skate received in said second slot, means interconnecting the pair of skates, and wherein the stop means comprises a separate element engageable with the connecting means to displace the pair of skates, said separate element being connected to the brake means and to the means biasing the plate toward the conveyor device.

5. An apparatus according to claim 4, wherein each of the skates are mounted on a rollway having needle bearings disposed in the slot.

6. An apparatus according to claim 5, wherein the connecting means for the pair of skates is an angle iron, wherein the apparatus includes a fixed stop integral with said table engaging the angle iron to limit the travel of the skates in a direction away from the conveyor device.

7. An apparatus according to claim 4, which further includes a fixed stop integral with said table, and wherein said means forming the connection between the skates comprises an abutment surface for engaging said fixes top to limit displacement of the pair of skates in a direction away from the conveyor device.

* * * * *